March 4, 1930.  L. E. WILLIAMS  1,748,967
ARTICULATED TONGUE FOR TRAILERS
Filed Nov. 26, 1926  2 Sheets-Sheet 1
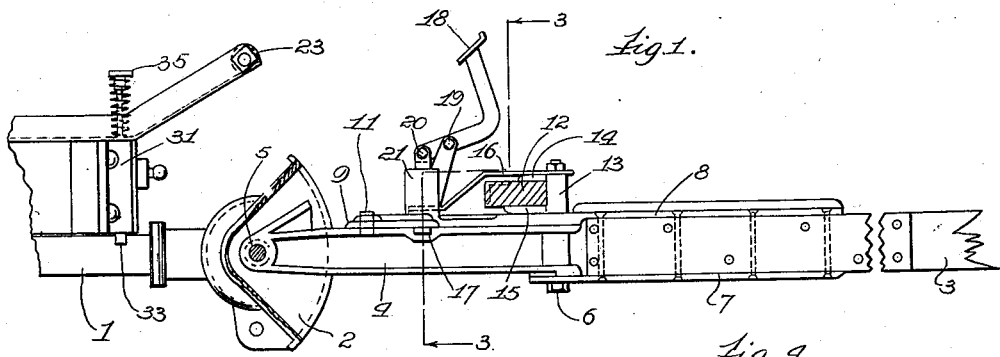
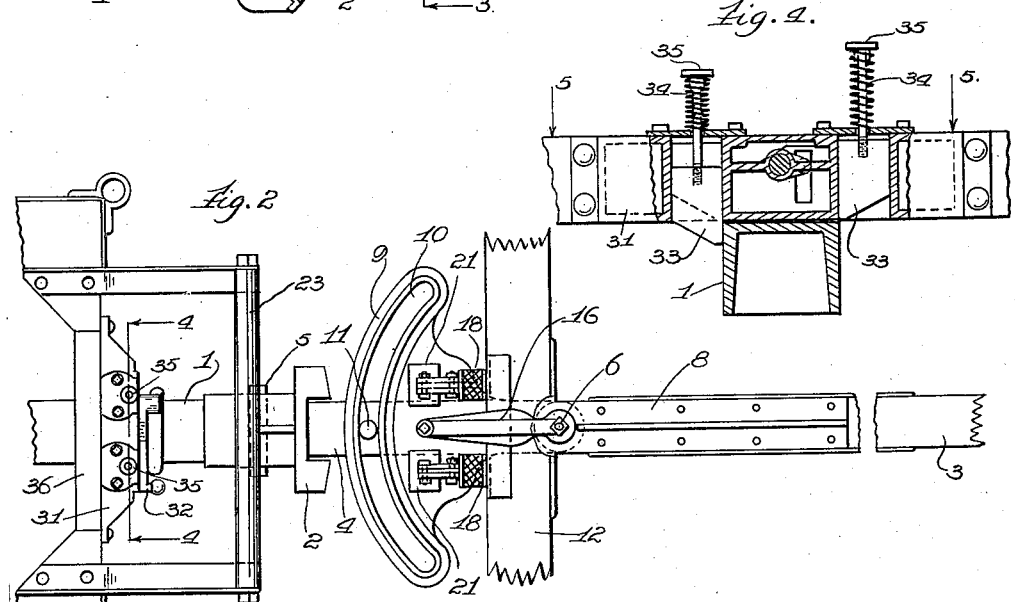
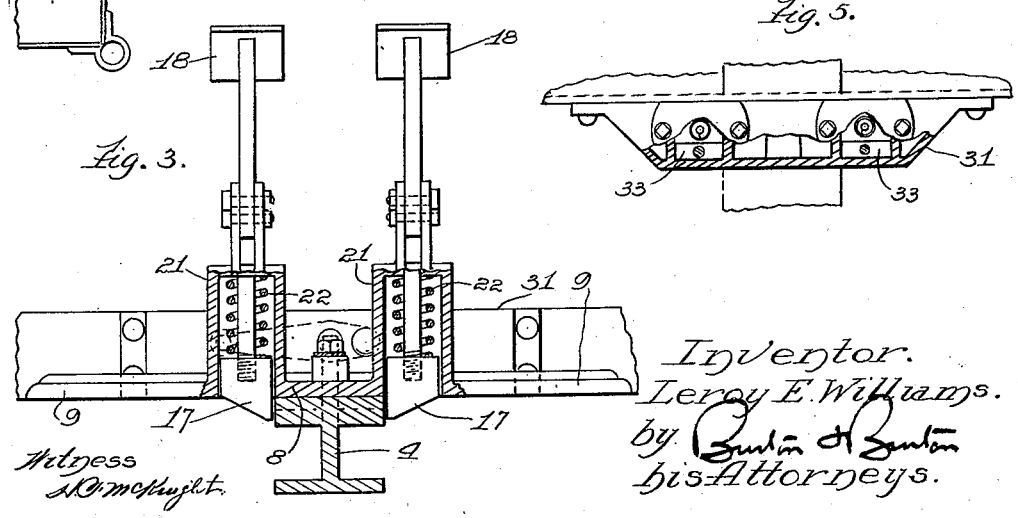
Inventor.
Leroy E. Williams.
by his Attorneys.

March 4, 1930.  L. E. WILLIAMS  1,748,967
ARTICULATED TONGUE FOR TRAILERS
Filed Nov. 26, 1926  2 Sheets-Sheet 2

Inventor.
Leroy E. Williams.
by Burton & Burton
his Attorneys.

Patented Mar. 4, 1930

1,748,967

UNITED STATES PATENT OFFICE

LEROY E. WILLIAMS, OF EDGERTON, WISCONSIN, ASSIGNOR TO HIGHWAY TRAILER COMPANY, OF EDGERTON, WISCONSIN, A CORPORATION OF WISCONSIN

ARTICULATED TONGUE FOR TRAILERS

Application filed November 26, 1926. Serial No. 150,658.

This invention relates to steering mechanism for vehicles, particularly of the horse-drawn type, and its object is to facilitate the operation of such vehicles in close quarters, as for example, in turning the corners of narrow streets or alleys. It consists of certain features and elements of construction in combination as herein shown and described, and as indicated by the claims.

In the drawings:—

Figure 1 is a side elevation partly in section showing a draft tongue embodying this invention.

Figure 2 is a top plan view with certain parts broken away.

Figure 3 is a detail section on a larger scale, taken as indicated at line 3—3 on Figure 1.

Figure 4 is a detail section taken as indicated at line 4—4 on Figure 2.

Figure 5 is a top plan view taken partly in section as indicated at line 5—5 on Figure 4.

Figure 6:
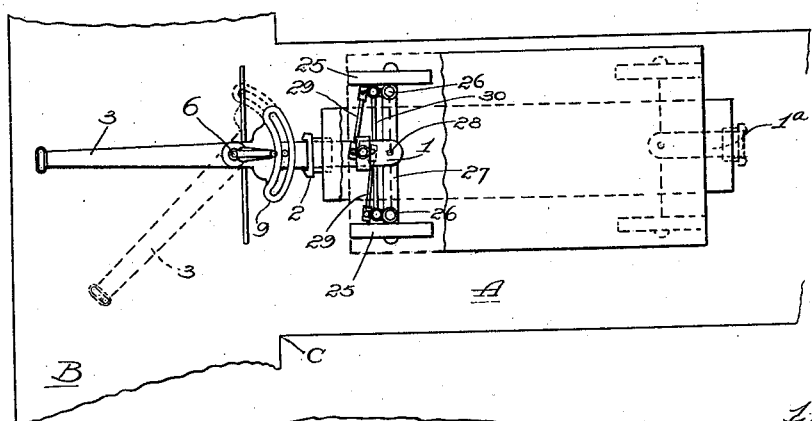
Figures 6, 7 and 8 are diagrammatic plan views representing a vehicle at several stages in the process of making a turn as hereinafter more fully described.

While this invention may be applicable to four-wheel vehicles of standard wagon construction, it has been particularly designed with reference to a four-wheel trailer which is arranged to be drawn either by a motor truck or tractor, or by a team of horses, as may be determined by convenience. Such a vehicle has at least one pair of wheels mounted for steering adjustment, and as shown in the diagrams, Figures 6, 7 and 8, the steering mechanism is similar to that employed on automobiles and trucks in which the two wheels are connected to the axle by vertical pivots near their respective hubs, and are then operated by any suitable linkage for turning simultaneously about these vertical pivots. In such a vehicle, whether connected to a motor tractor or to a team of horses, there is a draw bar, 1, pivotally attached to the vehicle frame for swinging from side to side and suitably connected with the steering linkage for effecting steering adjustment of the front wheels. The draw bar, 1, is provided with a suitable coupler head, 2, in which any form of draft member may be inserted. As shown in the drawings, the draft member employed for use with a team of horses is a tongue, 3, having a rear section, 4, preferably of metal and secured in the coupler head, 2, by a horizontal pivot or coupling pin, 5. The part, 4, and the tongue proper, 3, form an articulated draft member by virtue of a vertical pivot, 6, which connects them. The rear end of the tongue, 3, is reinforced by a metal plate, 7, at its lower side and a metal casting, 8, on its upper side, and these two members form a clevis pivotally engaged by the bolt, 6, above and below the member, 4. The casting, 8, extends rearwardly over the member, 4, widening into an arcuate portion, 9, formed with a curved slot, 10, which is concentric with reference to the pivot, 6, so that when the tongue, 3, swings laterally about its pivot, 6, the slot, 10, traverses a guide stud, 11, upstanding in the member, 4, and the swing of the tongue, 3, is limited in either direction by encounter of the ends of the slot, 10, with the stud, 11.

For attaching the draft horses an evener bar, 12, of the usual construction is mounted on top of the casting, 8, just back of the pivot bolt, 6. A sleeve, 13, engaging the upper end of the bolt and formed with lugs, 14 and 15, embracing the evener bar, 12, provides the pivotal mounting for the evener, and a brace arm, 16, engaging the bolt, 6, just above the sleeve, 13, extends rearwardly over the evener, 12, to a point of anchorage on the casting, 8, for reinforcing the bolt, 6.

Normally the two parts, 3 and 4, of the articulated tongue are held in alignment by latch bolts, 17, extending downwardly from the casting, 8, (which is rigid with the member, 3) to engage opposite sides of the member, 4, as shown clearly in Figure 3. These latches, 17, are releasable separately or simultaneously by means of individual foot pedals, 18, each having a fulcrum, 19, and a pivotal connection at 20 with the upper end portion of the latch, 17, where it projects through a housing, 21, formed as an integral part of the casting, 8, serving to enclose a spring, 22, reacting downwardly upon the latch, 17, to hold it normally in locking position. The drawings show a raised rail, 23, upon which the driver normally rests his feet, and the pedals, 18, are within easy reach of a driver occupying this position.

In Figure 6 I have illustrated a steering linkage which may be understood as substantially that shown in Patent No. 1,385,361, to C. G. Clement, and in which the wheels, 25, are mounted on the stub axles connected by vertical pivots, 26, to the axle member, 27. The draw bar, 1, is pivoted at 28 above the center of the axle, 27, and is connected by individual drag links, 29, 29, to the steering knuckle arms associated with the pivots, 26. These knuckle arms are also transversely connected by a tie rod, 30, and the inner ends of the drag links, 29, are attached to the draw bar, 1, by means of a short equalizer lever more fully described in said Clement patent. The mechanism serves to cause steering movement of the wheels, 25, when the draw bar, 1, is swung to one side or the other of its middle position. It is quite usual in a four-wheel trailer to make both ends alike so that the vehicle may be operated with equal facility in either direction. In this case draw bars are provided at both ends and locking means is located at each end of the frame for holding one draw bar or the other in its middle position so that the wheels serving as the rear wheels of the trailer will be held rigidly in straight-ahead position like the rear wheels of a wagon. A lock for this purpose is described in Patent No. 1,574,469, to C. G. Clement, and the housing containing a somewhat similar lock is indicated at 31 in the drawings, provided with a crank handle, 32, which can be operated to simultaneously depress or permit simultaneous automatic raising of the locking dogs or latches. When the vehicle is being operated, such locking means at the forward end of the frame will be retracted upwardly into the casing, 31, and therefore are not visible in Figures 1 to 5. However, for the purposes of the present invention, I mount in each of the locking casings, 31, a pair of supplemental latches, 33, which are vertically slidable for engaging one or both sides of the draw bar, 1, and which are normally held upward out of engagement with the draw bar by means of springs, 34, shown above the casing, 31. The springs, 34, engaged under the heads of bolts, 35, which form rigid extensions of the latches, 33, and being disposed on the end member, 36, of the frame, are within convenient reach of the driver's heel, so that he can depress either one of the latches, 33, at will.

Figure 7:
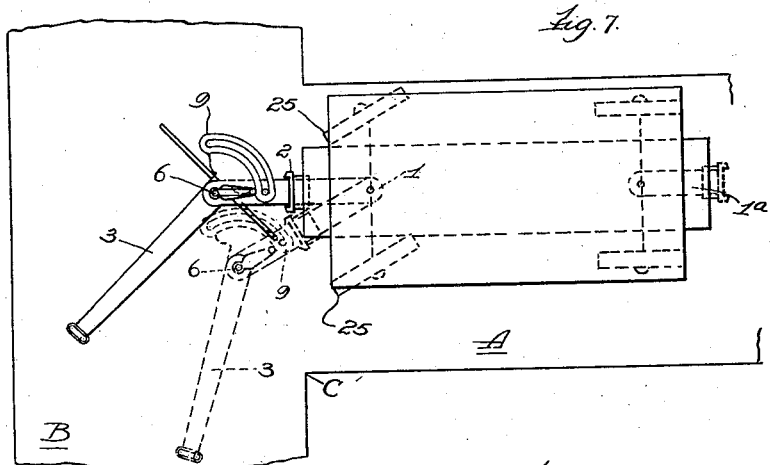
Figure 8:
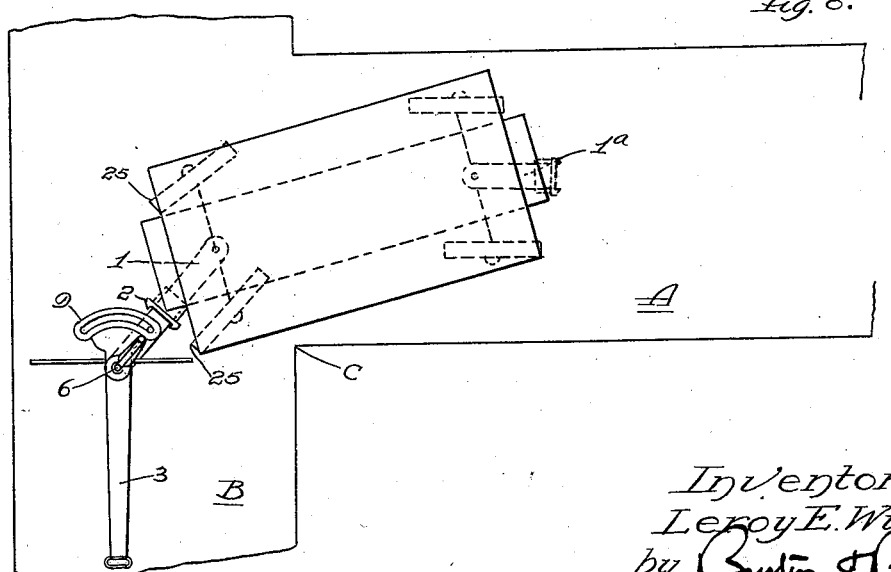

Figures 6, 7 and 8 represent the intersection of narrow roadways or alleys, A and B, and indicate diagrammatically the various positions of the trailer as it is advanced from the roadway, A, into the roadway, B. During the first stage, as indicated in Figure 6, the horses are driven straight forward as far as possible, practically to the far side of the road, B, so that the tongue, 3, stands across said roadway, B. During this advance the driver depresses one of the latches, 33, to prevent steering movement of the wheels, 25. Then when the horses have reached the far side of the road, B, he depresses one of the pedals, 18, so as to permit the tongue, 3, to turn about the pivot bolt, 6, to the dotted line position of said tongue, indicated in Figure 6 and limited by the slot, 10. This will permit a slight further advance of the vehicle in the roadway, A, toward the road, B, and during such advance the latch, 33, is released to allow the draw bar, 1, to swing and turn the steering wheels, 25, as shown in Figure 7. From this point the advance of the vehicle is in an oblique direction, tending to carry the vehicle body toward the corner, C, of the intersection and where the roadways are extremely narrow as indicated in the drawings, the turn may be completed by unlocking the draw bar, 1$^a$, at the rear of the vehicle and inserting a short pole in its coupler for manipulating the steering mechanism at the rear by hand, so that as the vehicle advances the rear end of the body may be directed in a curved path to clear the corner, C. Meanwhile, the tongue, 3, will have completed the turn and come into alignment with the roadway, B, allowing the horses to travel straight forward in that road, and as the vehicle swings into line with the tongue, 3, the sloping face of the latch, 17, will allow it to ride over the member, 4, and snap down into locking position as the parts 3 and 4 come into alignment.

Thus the jointed connection of the tongue at 6 permits the vehicle to be maneuvered in narrow alleys where it could not be used at all if the tongue were rigid. This is perhaps of more importance when combined with the automobile type of steering mechanism because the latter seldom permits as much as a forty-five degree turn of the wheels, 25, and therefore precludes swinging the tongue at nearly ninety degrees to the body as can be done with the standard wagon equipped with the "fifth wheel" steer.

I claim:

1. In a vehicle having dirigible wheels and a draft member by which they may be steered, a tongue pivotally attached to the draft member for lateral movement, with automatic locking means rearwardly of said pivotal connection normally holding said tongue in alignment with the draft member and releasable at will by the driver in his driving position on the vehicle.

2. In a vehicle having dirigible wheels and a draft member by which they may be steered, a tongue pivotally attached to the draft member for lateral movement with respect thereto, and means on the tongue and draft member rearwardly of said pivotal connection limiting the swing of said tongue about such pivotal connection.

3. In a vehicle having dirigible wheels and a draft member by which they may be steered, a tongue pivotally attached to the draft member for lateral movement, yieldable locking means normally holding said tongue in alignment with the draft member releasable at will and yieldingly returnable to locking position while the tongue remains out of alignment, said locking means including a cam surface permitting said means to yield as the tongue returns to aligned position, and adapting the lock for automatic re-engagement when the parts are aligned.

4. In a vehicle having dirigible wheels, an articulated draft member by which they may be steered comprising two parts connected by a vertical pivot, one part extending over the other beyond said pivot and carrying a pair of yieldable latches engaging said other part at its opposite sides for holding the parts in alignment, together with means for withdrawing either latch at will.

5. In the combination defined in claim 4, each of said latches having a beveled face adapted to ride over the overlapped part for automatic re-engagement therewith after misalignment and return of the parts to aligned position.

6. In a vehicle having dirigible wheels and a draft member by which they may be steered, a tongue pivotally attached to the draft member for lateral movement with respect thereto, and locking means engageable at will with the draft member for opposing its movement away from central straight ahead position, comprising a pair of latches normally held yieldingly at inoperative position and adapted to be moved singly or simultaneously into engagement with the sides of the draft member.

7. In the combination defined in claim 6, additional locking means normally holding said tongue in alignment with the draft member and releasable at will.

8. In a vehicle having dirigible wheels and a draft member by which they may be steered, a tongue pivotally attached to the draft member for lateral movement with respect thereto, and an evener pivotally mounted at a point co-axial with said pivotal connection.

9. In a vehicle having dirigible wheels and a draft member by which they may be steered, a tongue pivotally attached to the draft member for lateral movement with respect thereto, locking means normally holding said tongue in alignment with the draft member and releasable at will, together with an evener pivoted to the tongue at the axis of said pivotal connection and adapted to swing about said axis independently of said locking means.

10. In a vehicle having dirigible wheels and a draft member by which they may be steered, a tongue pivotally attached to the draft member for lateral movement with respect thereto, locking means for normally holding said tongue in alignment with the draft member comprising a pair of yieldable latches engaging opposite sides of said member, additional locking means yieldably engageable at will with the draft member for opposing its movement away from central straight-ahead position, actuating means for releasing the tongue-locking devices at will singly or simultaneously, and actuating means for operating the draft member lock, both disposed in reach of the driver in his driving position.

In testimony whereof, I have hereunto set my hand at Edgerton, Wisconsin, this 22 day of November, 1926.

LEROY E. WILLIAMS.